United States Patent [19]
Ulrich et al.

[11] Patent Number: 5,103,341
[45] Date of Patent: Apr. 7, 1992

[54] UV-CAPABLE DRY LENS FOR MICROSCOPES

[75] Inventors: Wilhelm Ulrich, Aalen; Franz Muchel, Konigsbronn, both of Fed. Rep. of Germany

[73] Assignee: Carl-Zeis-Stiftung, Heidenheim/Brenz, Fed. Rep. of Germany

[21] Appl. No.: 524,085

[22] Filed: May 15, 1990

[30] Foreign Application Priority Data

May 16, 1989 [DE] Fed. Rep. of Germany ....... 3915868

[51] Int. Cl.⁵ .................. G02B 21/02; G02B 15/14
[52] U.S. Cl. .................................. 359/657; 359/350; 359/354; 359/658
[58] Field of Search ............. 350/1.2, 414; 359/350, 359/354, 657, 658

[56] References Cited

U.S. PATENT DOCUMENTS

| | | | |
|---|---|---|---|
| 4,009,945 | 3/1977 | Klein | 350/414 |
| 4,046,460 | 9/1977 | Koizumi | 350/414 X |
| 4,059,342 | 11/1977 | Tojyo | 350/414 |
| 4,200,352 | 4/1980 | Yuta | 350/412 |
| 4,403,835 | 9/1983 | Ushida | 350/414 |
| 4,666,256 | 5/1987 | Shimizu et al. | 350/414 |
| 4,770,477 | 9/1988 | Shafer | 350/1.2 |

FOREIGN PATENT DOCUMENTS

| | | |
|---|---|---|
| 284414 | 9/1988 | European Pat. Off. |
| 3633088 | 6/1987 | Fed. Rep. of Germany |
| 584274 | 1/1978 | U.S.S.R. |

Primary Examiner—Scott J. Sugarman
Attorney, Agent, or Firm—Eugene Stephens & Associates

[57] ABSTRACT

An UV-capable dry objective for microscopes in which aperture aberration is corrected, at the same time, both for the visible spectrum and for a selected UV-wavelength. The objective comprises two lens groups separated by an air gap which is varied in size by relative movement between the two lens groups. The size of the air gap is adjusted to correct aperture aberration for the selected UV-wavelength. The objective is designed so that the mathematical sign is the same for both (i) the corrections required as the illumination moves toward the longer-wave portion of the visible spectrum, and (ii) for the corrections required as the illumination moves toward the shorter-wave portion of the UV-spectrum. The objective has an aperture of at least 0.7 and a magnification of more than 60×.

23 Claims, 13 Drawing Sheets

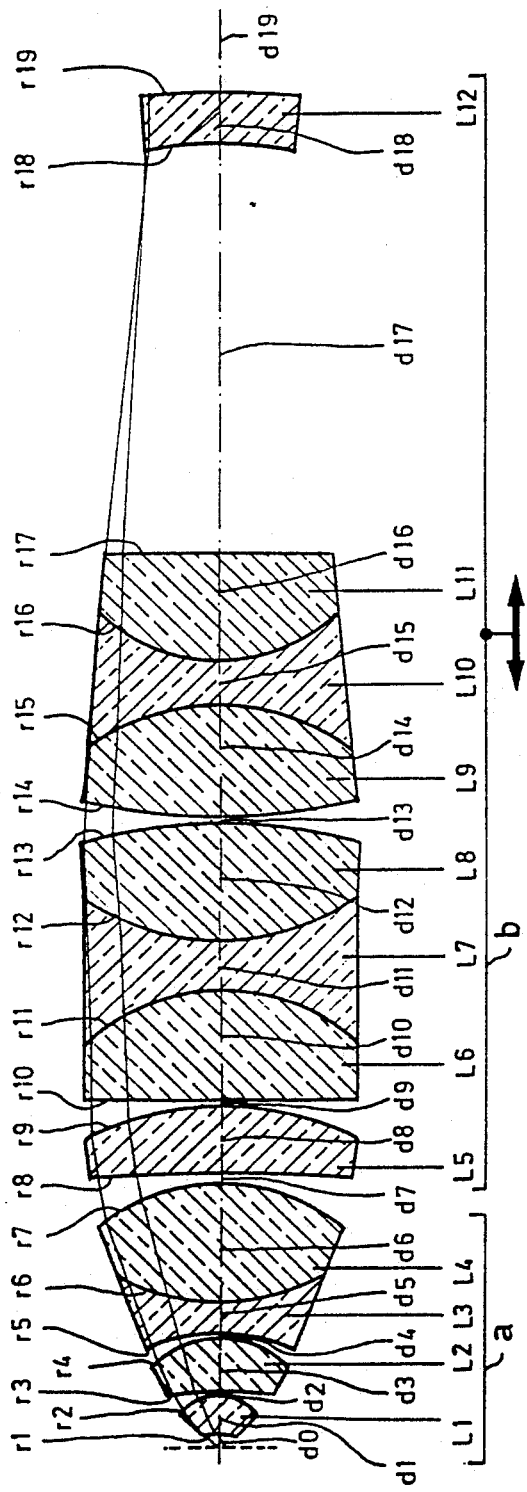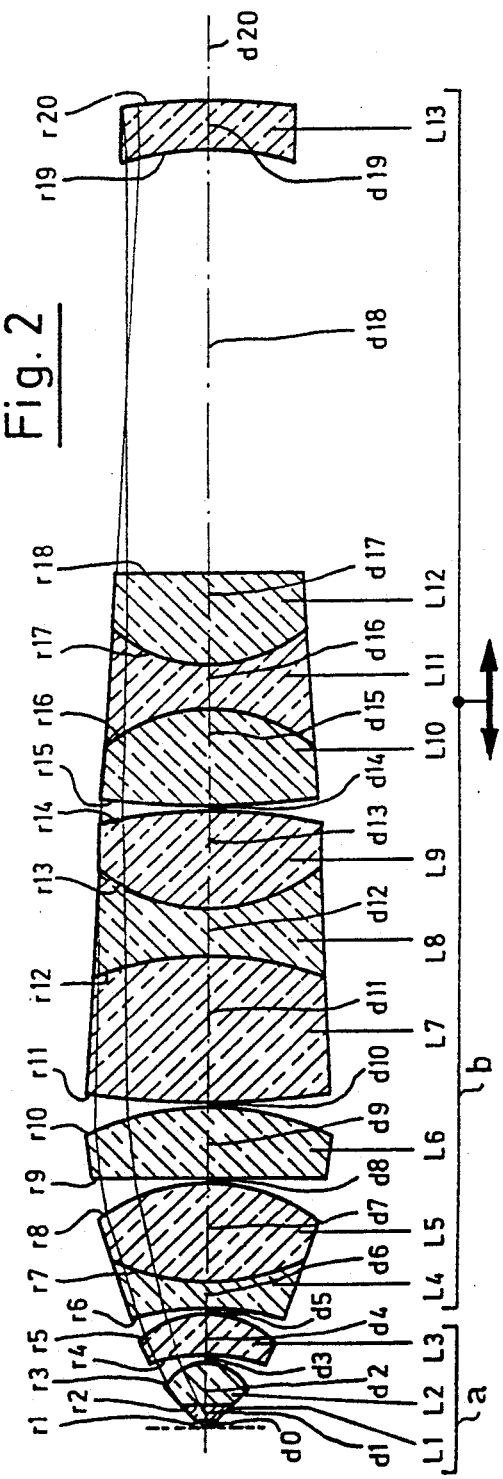

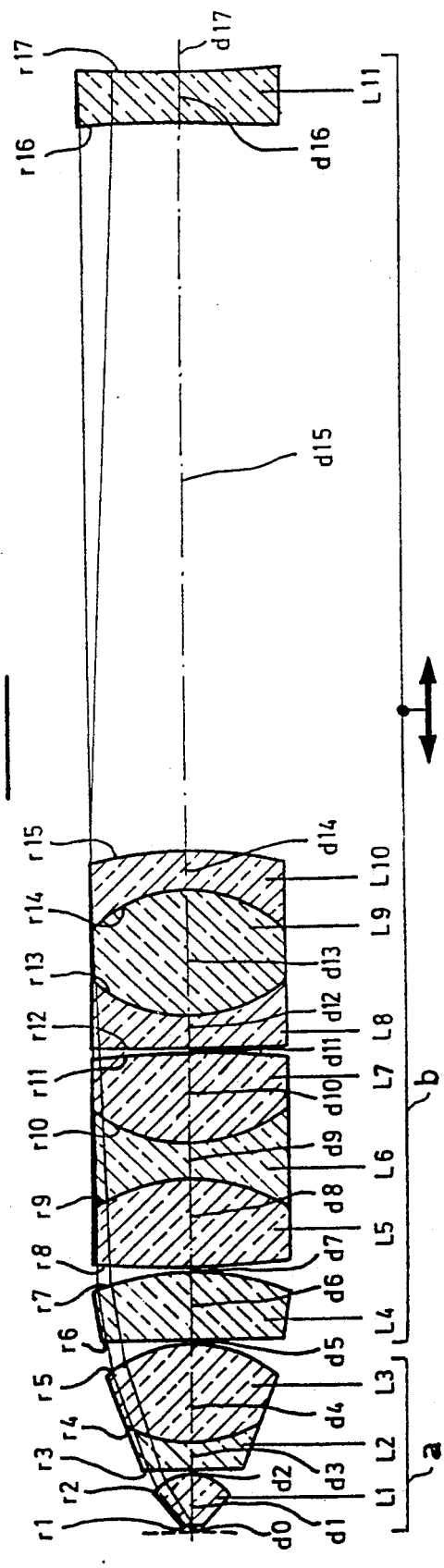
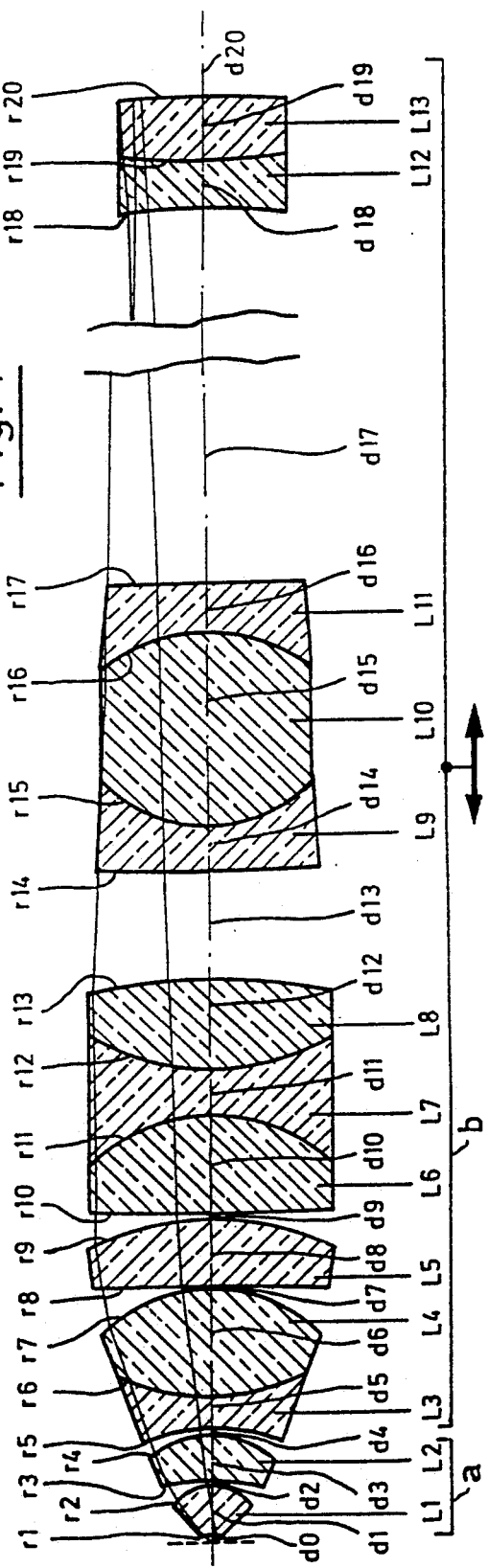

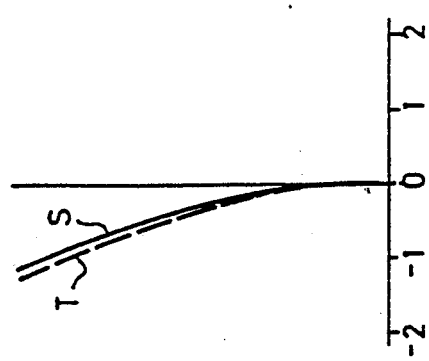
Fig.8c ASTIGMATISM
Fig.8b DISTORTION %
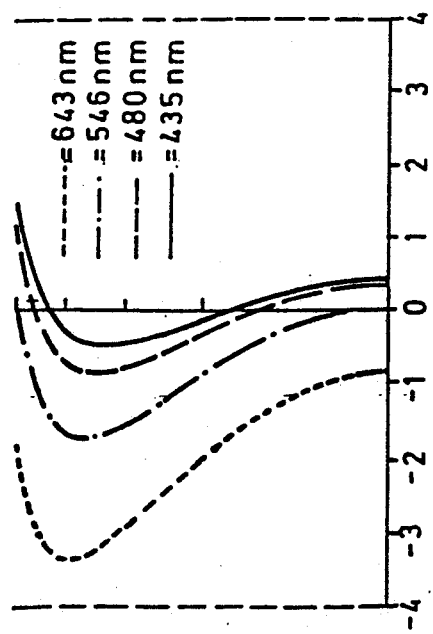
Fig.8a SPHERICAL ABERRATION
= 643 nm
= 546 nm
= 480 nm
= 435 nm

DEF. BRIGHTNESS = 0.784
RMS = 0.089
WL = 643.8
YH = 0.010 MM

DEF. BRIGHTNESS = 0.823
RMS = 0.079
WL = 546.1
YH = 0.010 MM

DEF. BRIGHTNESS = 0.865
RMS = 0.061
WL = 302.1
YH = 0.010 MM

UV-CAPABLE DRY LENS FOR MICROSCOPES

TECHNICAL FIELD

This invention relates to optical lens design and, more particularly, to microscope lens systems usable in the ultraviolet region of the spectrum, i.e., "UV-capable" lenses.

At the present time, UV-capable lenses can be divided into two general classes, namely:

Dry lenses, which have a relatively small lateral amplification and limited aperture (such as the Carl Zeiss "Ultrafluar 10/0.25" lens); and Immersion lenses, which have a relatively large lateral amplification and a high aperture (such as the Carl Zeiss "Ultrafluar 100/0.85" lens).

However, there are no high-aperture dry lenses that are both UV-capable and effective over a relatively large working distance because, as the working distance of such a lens is increased, the more difficult it is to correct aperture aberration and Gaussian error. These difficulties arise because a UV-translucent lens requires correction across a very large spectral range and there are very few UV-translucent glasses available for that purpose.

Nonetheless, since UV-lenses can provide acceptable resolution of viewed structures in a size range below 1 $\mu$m, UV-capable lenses are demanded for special industrial uses, for instance, for measuring the structural width of uncovered objects such as wafers used in the semiconductor industry. These lenses should also be corrected in the visible spectral region up to a field of 25 mm in order to allow visual observation and focusing of the object to be measured by the observer. Then, in order to increase resolution for the actual measuring of the object, the surface of the wafer would be scanned by an automatic confocal beam having a discrete wavelength in the UV-range. Lenses appropriate for that purpose should have a lateral amplification of $-60$ to $-100$ and an aperture of at least 0.7. Additionally, such lenses should possess a flat field of vision and be free of distortion.

However, as indicated above, prior art lenses do not have the just-described characteristics. For instance:

German patent 36 33 088 describes a UV-capable microscope lens system comprising nine lenses, but it is suitable only up to a wavelength of 450 nm.

Russian patent document 58 42 74 discloses a microscope lens system which consists of eleven lenses and which is allegedly UV-capable, but the document provides no specifics with regard to its design parameters and/or condition of correction.

U.S. Pat. Nos. 4,200,352 and 4,770,477 each describe UV-capable lens systems which, while providing adequate correction of aperture aberration across the spectral range, have only a low aperture and provide low lateral amplification.

European patent document A2-284 414 describes a UV-lens system for use in the manufacture of semiconductors, but this lens system is corrected only for the UV-range.

The prior art also includes high-aperture dry lens systems for microscopes where the spherical aberration can be adjusted by displacement of lens elements and components to compensate for cover glasses with different thicknesses. Such lens systems have been described, for instance, in U.S. Pat. Nos. 4,059,342 and 4,666,256. However, these lens systems are unsuited for the described application because, first, they are not corrected for the UV-range and, second, their aperture aberration cannot be optimized specifically for a certain wavelength.

Therefore, there is definite need for a high-aperture UV-capable lens system for microscopes which not only is suitable correctable in the visible spectral range but, additionally, is correctable with regard to aperture aberration for several wavelengths in the UV-spectral range so that a measuring beam can be focused by the lens system within the limits of diffraction.

The lens system disclosed below has all of these needed characteristics.

SUMMARY OF THE INVENTION

All four preferred embodiments of our invention are, in part, based upon the concept that it is not absolutely necessary for a UV-capable lens system to be correctable with regard to aperture aberration such that a diffraction-limited focal diameter will be obtained across the entire usable spectral range. Instead, it is sufficient if the lens system has good correction within the visible spectral range and, simultaneously, is optimally corrected for a single, preselected UV-wavelength, so long as it is possible to change the preselected UV-wavelength for which the lens system is optimally corrected. In this way, the lens system can be readily adapted to the various, more or less monochromatic, UV-beam sources that are used in the semiconductor industry.

By changing the air space at a suitably selected point between two relatively shiftable parts of the lens system disclosed herein, the aperture aberration can be optimized for specific UV-wavelengths while, at the same time, retaining a good correction in the visible spectral range. This makes it possible to correct the lens system for any individual wavelength in the entire UV-spectral range to adapt the lens system to the particular beam source that is used and needs to be focused.

When correcting the lens system for those changes of aperture aberration which are contingent upon wavelength (i.e., Gaussian error), it is particularly desirable if the mathematical sign is the same for both the corrections required (a) as the wavelength of the illumination moves toward the longer-wave portion of visible spectrum and (b) as it moves toward the shorter-wave portion of the UV-spectrum.

In the prior art referred to above in which dry lens systems are corrected to adapt to cover glass of varying thicknesses, aperture aberration is corrected by varying an air space which separates elements and components in the lens system with comparably large diffractive power, and in such systems it has been assumed that the aberrant effects of the fixed lens group remain constant and that only the lens group that is shifted relative to the fixed group (e.g., the rear group of lenses) causes the aperture aberration. However, this assumption applies only when the working distance of the overall lens system remains unchanged when refocusing after the corrective adjustment of the shifted lens group. If spacing variation occurs within the front group of a lens system, where the opening beam generally is still greatly divergent, the working distance of the overall lens system changes noticeably, and this also varies the angles of incidence within the front lens group, making a significant contribution to the effect of any spacial adjustments made to reduce aperture aberration.

Therefore, we selectively vary the air space in our lens systems so that (i) changes in aperture aberration caused by a shift of the system's rear lens group (designated "b") and (ii) the contributions which the system's front lens groups (designated "a") of the lens system make to aperture aberration during subsequent refocusing of the system, will have the same mathematical sign and, thus, will not compensate but rather amplify one another. By doing this it is possible to accomplish the desired corrections of aperture aberration with such relatively small air space changes in the lens system that the overall basic corrections of the lens system (i.e., the other remaining aberrations) will change only very little. In addition, the working distance of such lens systems, which in most cases is very minimal to begin with, is not reduced further by the corrective adjustments of our invention.

According to our invention, it is possible to design a well corrected, UV-capable dry lens system with an aperture of at least 0.7 and a lateral amplification of more than 60× with eleven to thirteen lenses. The lenses consist suitably of the glass types Suprasil and fluorite, so that our lens systems function well with illumination having wavelengths from about 650 mm in the long-wave visible spectrum down to about 240 nm in the UV-range.

BRIEF DESCRIPTION OF THE DRAWINGS

FIGS. 1-4 show, respectively, lens sections of each of four preferred embodiments for the lens system according to the invention;

FIGS. 5a-c, FIGS. 6a-c, FIGS. 7a-c, and FIGS. 8a-c each of the respective lens systems of FIGS. 1-4;

DETAILED DESCRIPTION

All of the lens systems, or objectives, illustrated in FIGS. 1-4 have the following in common:

In each of the front lens groups, the first lenses are used for approximately collimating the entering beam, and basic image aberrations are then corrected by means of different combinations of cemented-element lenses having low diffraction power. Also, in each system a field lens in the rear part of the objective corrects the Petzval sum and other field-contingent image aberrations. However, these preferred systems differ from each other in terms of working distance, the number of lenses used, and the structure of the cemented components.

The embodiment illustrated in FIG. 1 features a concave-convex front lens (L1) which is followed by another concave-convex individual lens (L2). Following these is a cemented component consisting of a biconcave lens (L3) and a biconvex lens (L4). These four lens elements form the first, fixed part (a) of the objective.

Following part (a), and separated therefrom by an air gap d7, is a second part (b) of the objective, which is movable relative to part (a). Part (b) has the following structure: a concave-convex individual lens (L5) is followed by a cemented component comprising three lenses, namely two biconvex collecting lenses (L6 and L8) between which a biconcave dispersing lens (L7) is enclosed.

The just-described first cemented component of part (b) is followed by a second cemented component consisting as well of three lenses. It comprises again two biconvex lenses (L9 and L11) which enclose a biconcave lens (L10). Behind the second cemented component of part (b), and separated from it by relatively large air space d17, is a field lens comprising concave-convex individual lens (L12). This field lens corrects essentially the Petzval sum and other field-contingent image aberrations.

The objective of FIG. 1 is manufactured according to the data shown in Table I.

TABLE I

| | (FIG. 1) | | |
|---|---|---|---|
| No. | Radius r/mm | Thickness/spacing d/mm | Glass |
| 0 | | .249 | |
| 1 | −.9716 | .740 | SPL |
| 2 | −.7608 | .100 | 1.0 |
| 3 | −3.4974 | .950 | FL |
| 4 | −1.6312 | .100 | 1.0 |
| 5 | −3.3497 | .600 | SPL |
| 6 | 4.2170 | 2.300 | FL |
| 7 | −3.2081 | .180 | 1.0 |
| 8 | −27.1880 | 1.300 | FL |
| 9 | −5.3088 | .100 | 1.0 |
| 10 | PLAN | 2.100 | FL |
| 11 | −3.3982 | .900 | SPL |
| 12 | 3.9242 | 2.300 | FL |
| 13 | −10.5930 | .100 | 1.0 |
| 14 | 12.3200 | 2.150 | FL |
| 15 | −4.0388 | .900 | SPL |
| 16 | 3.1623 | 2.000 | FL |
| 17 | PLAN | 7.840 | 1.0 |
| 18 | −4.8697 | 1.000 | FL |
| 19 | −25.3000 | 22.570 | 1.0 |

Figure 5C:
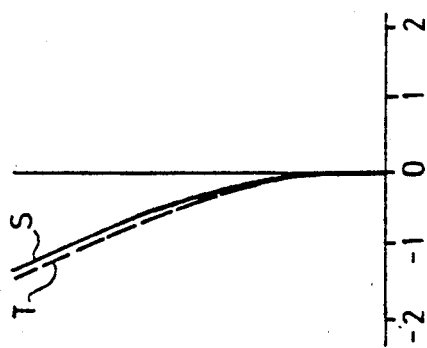
Figure 5B:
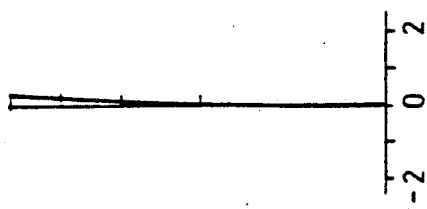
Figure 5A:
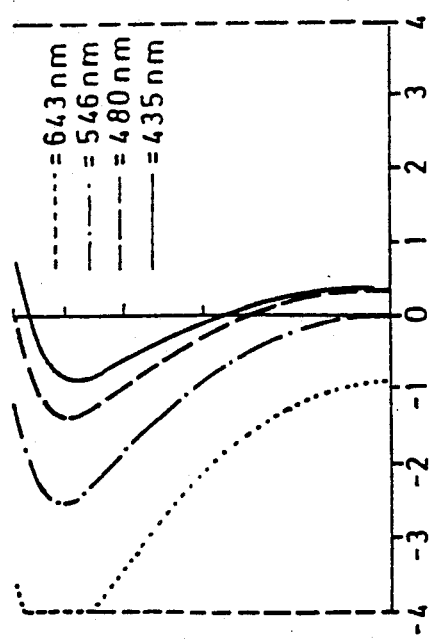
Figure 6C:
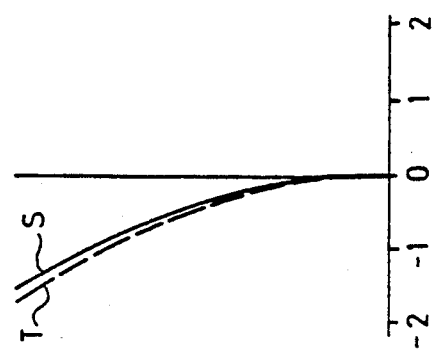
Figure 6B:
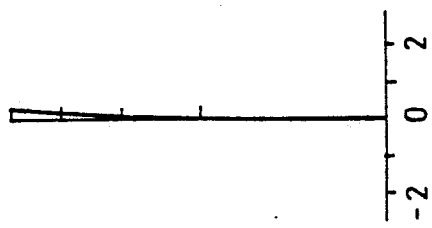
Figure 6A:
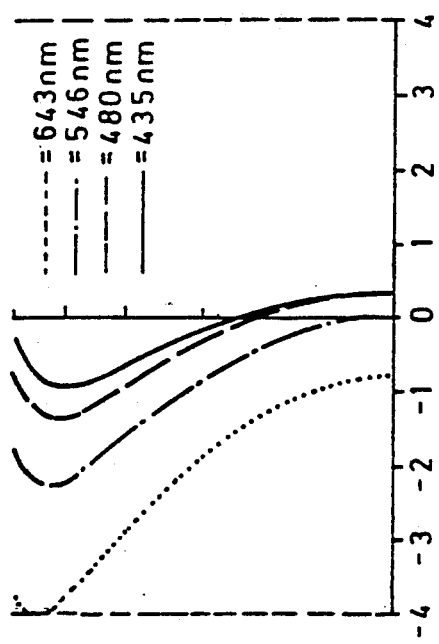
Figure 15:
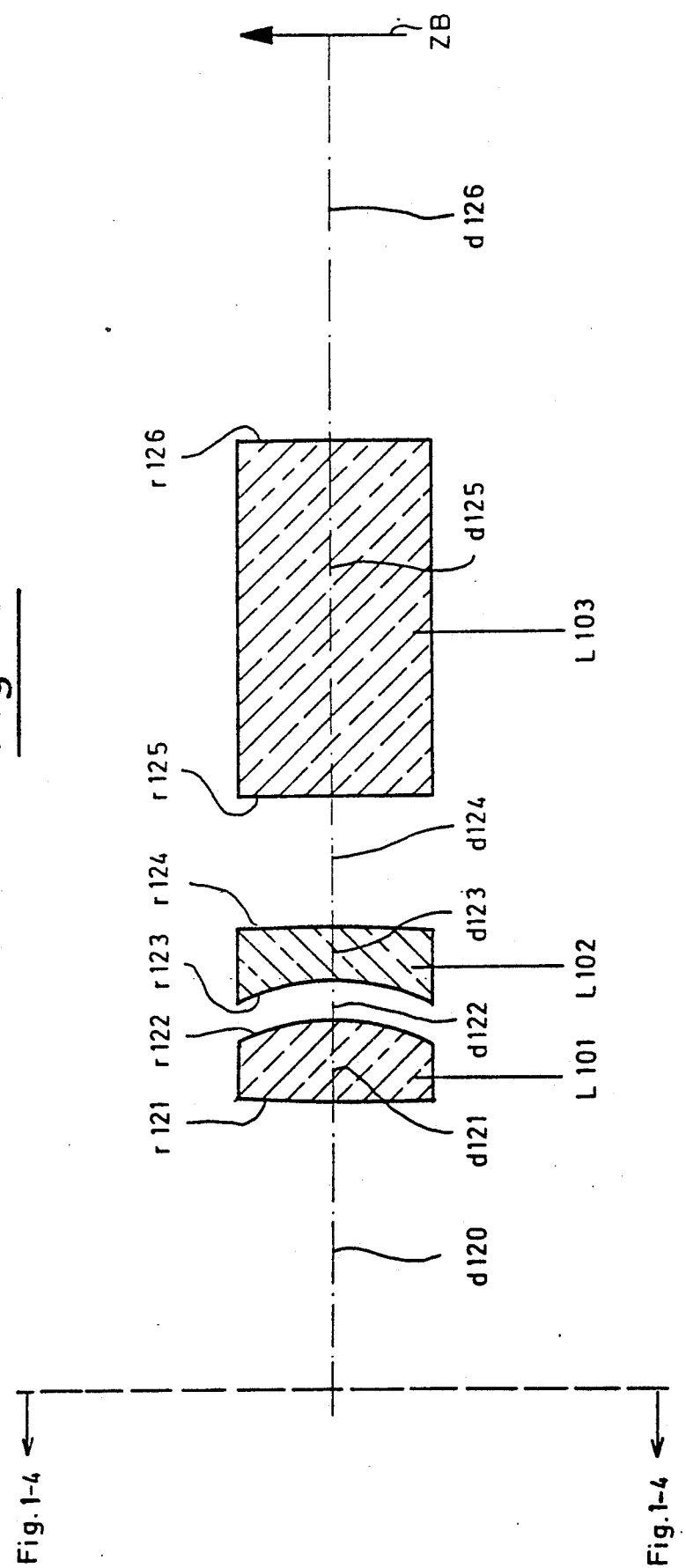
FIG. 15 shows the schematic cross section of the tubular UV-lens system which is used in combination, respectively, with each of the lens systems shown in FIGS. 1-4.

Working distance: $d_0 = 0.249$ mm
Numeric aperture: NA = 0.80-0.87
Lateral amplification: $\beta = -100\times$
SPL = Suprasil
FL = Fluorite Correction curves pertaining to the lens system of FIG. 1 for spherical aberration, distortion and astigmatism, are illustrated in FIGS. 5a-c. It should be noted that spherical aberration and astigmatism are indicated in Raleigh units, while distortion is shown as a percentage. The objective is corrected to an infinite focal intercept and, in combination with the UV-tubular lens illustrated in FIG. 15, generates an intermediate image ZB. The tubular lens has a focal length of 164.6 mm and comprises a collecting lens (101) and a dispersing lens (102). Block L103 represents the binocular prism in the barrel of the microscope through which the image path passes. The design parameters of the tubular lens system are listed in Table V.

TABLE V

| No. | Radius r/mm | Thickness/spacing d/mm | Glass |
| --- | --- | --- | --- |
| 121 | 107.4600 | 5.700 | SPL |
| 122 | −42.1700 | 1.130 | 1.0 |
| 123 | −40.3880 | 3.800 | FL |
| 124 | −281.8400 | 9.001 | 1.0 |
| 125 | PLAN | 42.040 | SPL |
| 126 | PLAN | 119.300 | 1.0 |

SPL (Suprasil);
FL (Fluorite);
1.0 = Air space

Figure 9:
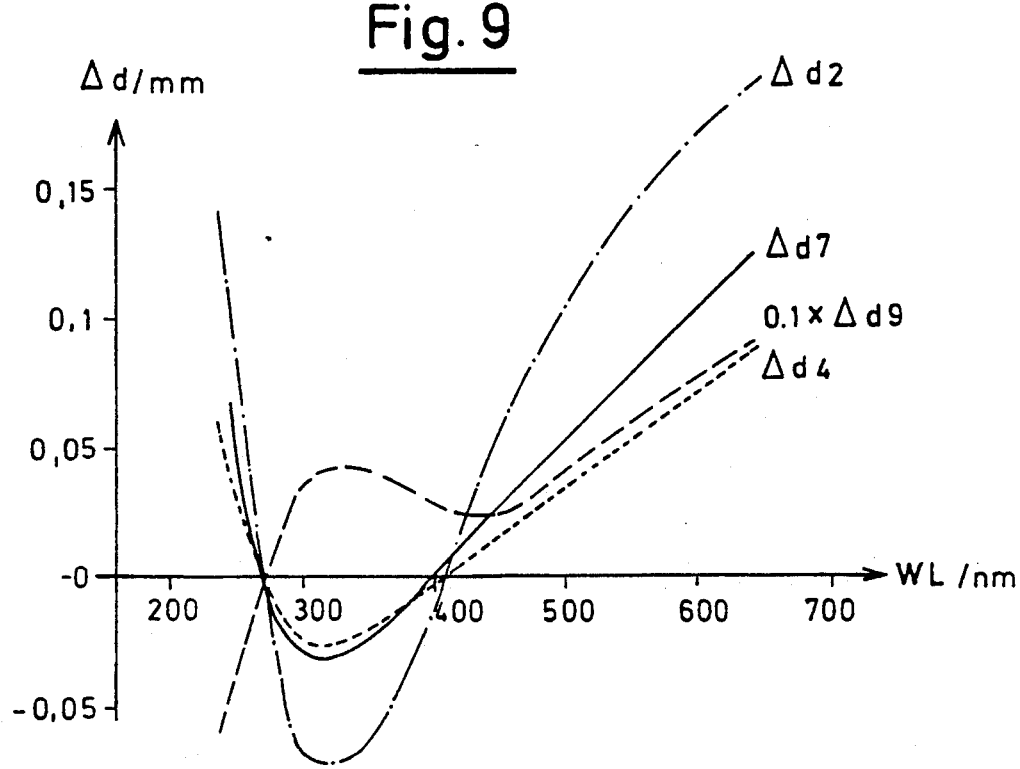
FIGS. 9-12, which also relate serially to the respective lens systems of FIGS. 1-4, show graphically the air space changes ($\Delta d$) necessary for an optimal correction of aperture aberration at various wavelengths, such changes being plotted for different identified air spaces (d2, d3, etc.) of each respective lens system.

As indicated above, the invention contemplates changing the air spacing between lens groups of the system to provide correction of aperture aberration for each individual wavelength in the UV-range. FIG. 9, which corresponds to the lens system of FIG. 1, plots, according to wavelength, the changes ($\Delta d$) in millimeters that must be made in the size of the air spaces d2, d4, d7, and d9 in order to maintain minimum aperture aberration. It is clearly evident from FIG. 9 that varying the size of air space d2 is unfavorable for this purpose because excessively large variations of this air space would be required to minimize aperture aberration throughout the UV-spectrum. Air space d9 is also unfavorable because, as can be seen from its respective curve, the curve has a turning point such that distance changes necessary for the UV-range extend, in terms of mathematical sign, opposite to distance changes required for the visible range. Contrarily, the air spaces d4 and d7 are both well suited because much smaller distance changes are sufficient for adaptation to the various wavelengths, and because their curves have no turning points throughout the entire spectral range, so that when aperture aberration is optimized for the UV-range between 240 and 280 nm, it remains fairly well corrected also in the visible spectral range. Therefore, in the preferred embodiment according to FIG. 1, movable lens part (b) is separated from fixed lens part (a) by the air space d7.

The second preferred embodiment is illustrated in FIG. 2 and differs from the earlier-described embodiment (FIG. 1) primarily in that the front lens is a cemented component consisting of two lenses (L1 and L2). Since this combination lens makes it possible to minimize aperture-dependent errors by controlling the design parameters of the front group, it can be seen from the curves of FIGS. 5a-c, that the basic correction of this objective is better to begin with. The lens data for this second embodiment are listed in Table II.

TABLE II

| | (FIG. 2) | | |
| --- | --- | --- | --- |
| No. | Radius r/mm | Thickness/spacing d/mm | Glass |
| 0 | | .137 | 1.0 |
| 1 | −1.0928 | .300 | SPL |
| 2 | 20.6762 | .790 | FL |
| 3 | −.8459 | .100 | 1.0 |
| 4 | −4.1330 | .800 | FL |
| 5 | −1.8234 | .100 | 1.0 |
| 6 | −4.6725 | .500 | SPL |
| 7 | 3.4961 | 1.900 | FL |
| 8 | −3.2424 | .100 | 1.0 |
| 9 | −134.2580 | 1.350 | FL |
| 10 | 5.2459 | .100 | 1.0 |
| 11 | 35.3889 | 2.803 | FL |
| 12 | −5.6431 | .900 | SPL |
| 13 | 2.9163 | 1.900 | FL |
| 14 | −11.6860 | .100 | 1.0 |
| 15 | 34.6749 | 1.800 | FL |

TABLE II-continued

| | (FIG. 2) | | |
| --- | --- | --- | --- |
| No. | Radius r/mm | Thickness/spacing d/mm | Glass |
| 16 | −2.9203 | .900 | SPL |
| 17 | 2.6543 | 1.700 | FL |
| 18 | 81.5481 | 8.059 | 1.0 |
| 19 | −6.0541 | 1.000 | FL |
| 20 | −13.3604 | 23.140 | 1.0 |

Figure 10:
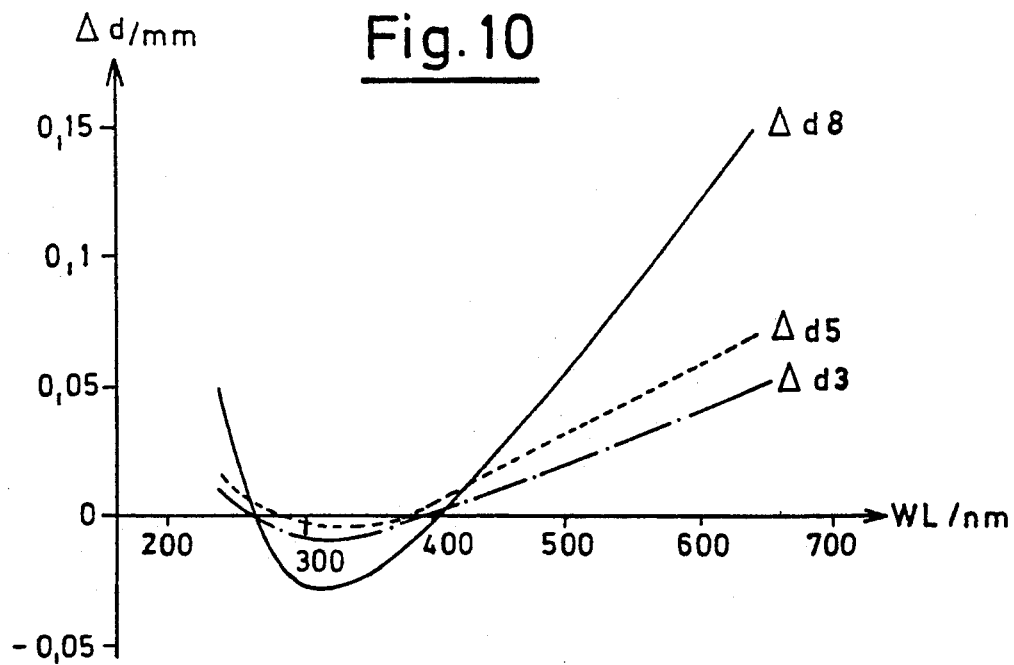

Working distance: do = 0.137 mm
Numeric aperture: NA = 0.80−0.88
Lateral amplification: $\beta = -100\times$
SPL = Suprasil
FL = Fluorite As can be seen clearly from the graph in FIG. 10 (which relates to the embodiment shown in FIG. 2), air spaces d3 and d5 of this embodiment are best suited for optimization of the aperture aberration for various UV-wavelengths. Air space d8, however, is also fairly well suited for that purpose. This is because in all three cases only relatively small variations in the size of the air spaces are required, and these incremental size changes, necessary for optimizing aperture aberration both toward the shorter-wave UV-range and toward the longer-wave visible spectral range, are in the same direction.

Figure 7C:
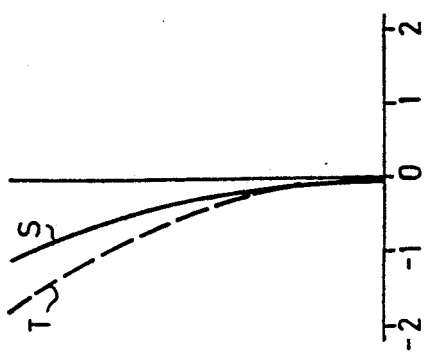
Figure 7B:
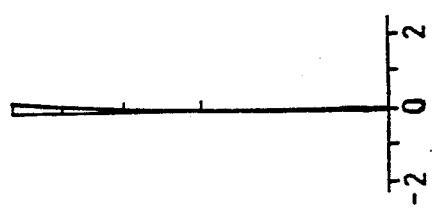
Figure 7A:
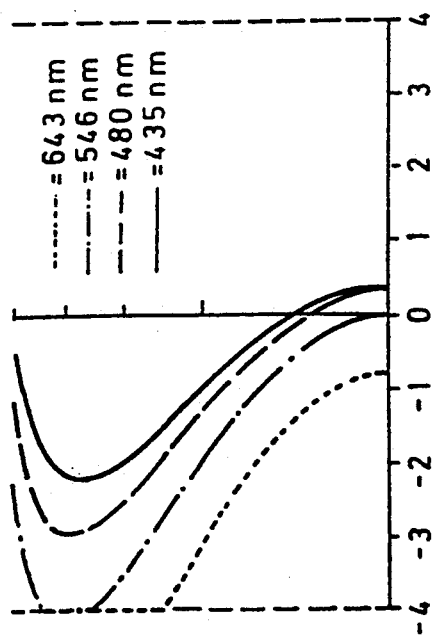

In the third preferred embodiment shown in FIG. 3, the objective has one fewer lens in the front lens group, the front lens (L1) being followed directly by a concave-convex cemented component comprising two lenses (L2) and (L3). As can be seen from the correction curves in FIGS. 7a-c, this embodiment is less satisfactory in regard to the correction of aperture aberration and Gaussian errors, and coma is not readily corrected either. Furthermore, the second cemented component of part (b), consisting of the three lenses (L8, L9, and L10), has radii which differ in terms of mathematical sign from the corresponding cemented component in the first embodiment (FIG. 1) which is formed by lenses L9, L10, and L11. That is, the latter comprises a dispersing lens enclosed by two collecting lenses, while the embodiment of FIG. 3 has a collecting lens (L9) enclosed by two dispersing lenses (L8 and L10). The design parameters of this third embodiment are listed in Table III.

TABLE III

| | (FIG. 3) | | |
| --- | --- | --- | --- |
| No. | Radius r/mm | Thickness/spacing d/mm | Glass |
| 0 | | .147 | 1.0 |
| 1 | −1.53483 | 1.013 | SPL |
| 2 | −.82861 | .100 | 1.0 |
| 3 | −20.9844 | .500 | SPL |
| 4 | 2.42272 | 1.950 | FL |
| 5 | −2.44624 | .100 | 1.0 |
| 6 | −74.5372 | 1.350 | FL |
| 7 | −5.05030 | .100 | 1.0 |
| 8 | 19.7665 | 1.800 | FL |
| 9 | −3.33476 | .700 | SPL |
| 10 | 2.83726 | 1.800 | FL |
| 11 | −20.5046 | .100 | 1.0 |
| 12 | 93.7628 | .700 | SPL |
| 13 | 2.64222 | 2.600 | FL |
| 14 | −2.57330 | .700 | SPL |
| 15 | −11.9566 | 14.77 | 1.0 |
| 16 | −29.0833 | 1.000 | FL |

TABLE III-continued (FIG. 3)

| No. | Radius r/mm | Thickness/spacing d/mm | Glass |
| --- | --- | --- | --- |
| 17 | 31.0171 | 19.05 | 1.0 |

Figure 11:
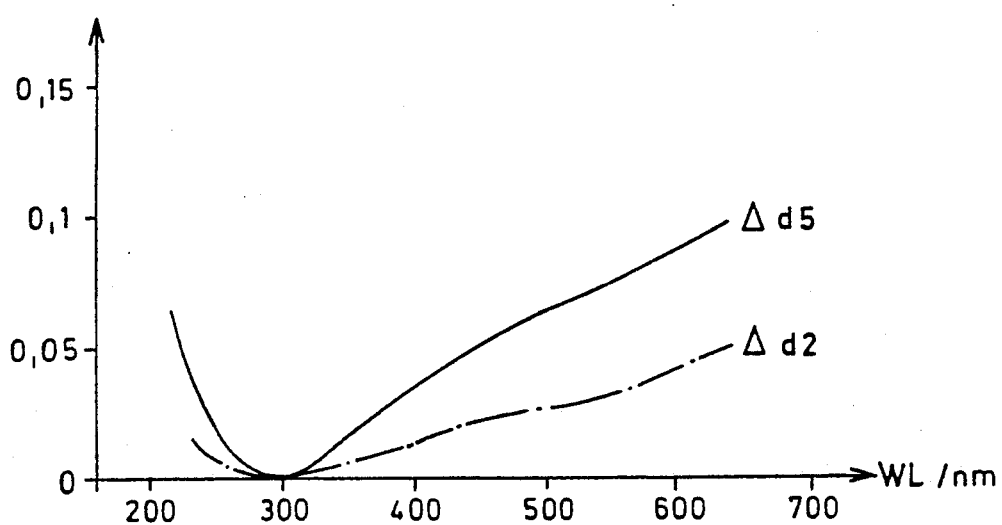

Working distance: do = 0.147 mm
Numeric aperture: NA = 0.80–0.86
Lateral amplification: $\beta = -100\times$
SPL = Suprasil
FL = Fluorite For this third embodiment, air spaces d2 and d5 are best suited to optimize aperture aberration for various wavelengths in the UV-range. This can be seen from the graph in FIG. 11 which plots, as a function of wavelength, the distance changes ($\Delta d$) for air spaces d2 and d5 (of the embodiment in FIG. 3) necessary for minimization of aperture aberration. For reasons related to its manufacture, air space d5 of this objective is selected to be varied for wavelength compensation. It should be noted that air spaces d7 and d11 of this third embodiment are unsuited for this purpose, since the variation of either of these spaces has relatively little effect on aperture aberration.

The fourth embodiment, which is illustrated in FIG. 4, corresponds fairly closely to the first embodiment (FIG. 1). However, in the final three-lens cemented components of each embodiment, both of which consist of three lenses (L9, L10 and L11), the center lenses (L10) have radii with opposite mathematical signs. Namely, the dispersing lens (L10) in FIG. 1 is replaced (in FIG. 4) with a collecting lens enclosed by two dispersing lenses. Further, in this fourth embodiment, a cemented component is used for the field lens. Due to these measures, although at the expense of the working distance, the correction with the objective of FIG. 4 is somewhat better than that achieved with the embodiment of FIG. 1. The respective correction curves for the embodiment of FIG. 4 are illustrated FIGS. 8a–c and its design parameters are listed in Table IV.

TABLE IV (FIG. 4)

| No. | Radius r/mm | Thickness/spacing d/mm | Glass |
| --- | --- | --- | --- |
| 0 |  | .140 | 1.0 |
| 1 | −.8233 | .937 | SPL |
| 2 | −.7741 | .100 | 1.0 |
| 3 | −3.4588 | .850 | FL |
| 4 | −1.7700 | .100 | 1.0 |
| 5 | −3.4445 | .600 | SPL |
| 6 | 4.0231 | 2.050 | FL |
| 7 | −3.0358 | .100 | 1.0 |
| 8 | −49.0796 | 1.300 | FL |
| 9 | −5.1074 | .100 | 1.0 |
| 10 | 68.5668 | 1.900 | FL |
| 11 | −3.3799 | .900 | SPL |
| 12 | 4.1450 | 1.800 | FL |
| 13 | −12.9361 | 2.056 | 1.0 |
| 14 | 37.1443 | .900 | SPL |
| 15 | 2.7743 | 3.800 | FL |
| 16 | −2.9506 | 1.000 | SPL |
| 17 | PLAN | 19.820 | 1.0 |
| 18 | −9.2679 | .900 | FL |
| 19 | 13.8695 | 1.200 | SPL |
| 20 | −22.4723 | 7.926 | 1.0 |

Figure 12:
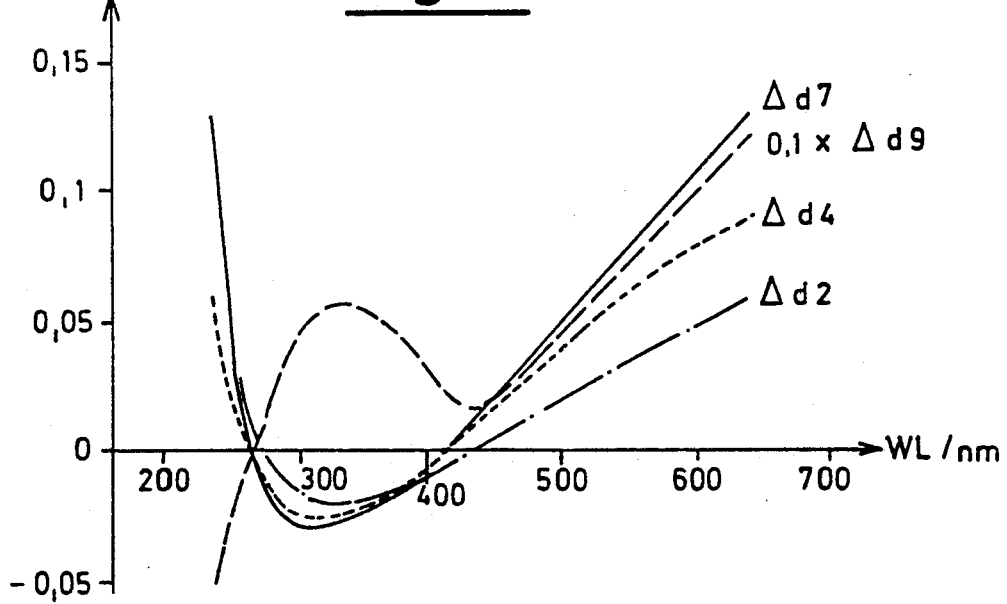
Figure 13C:
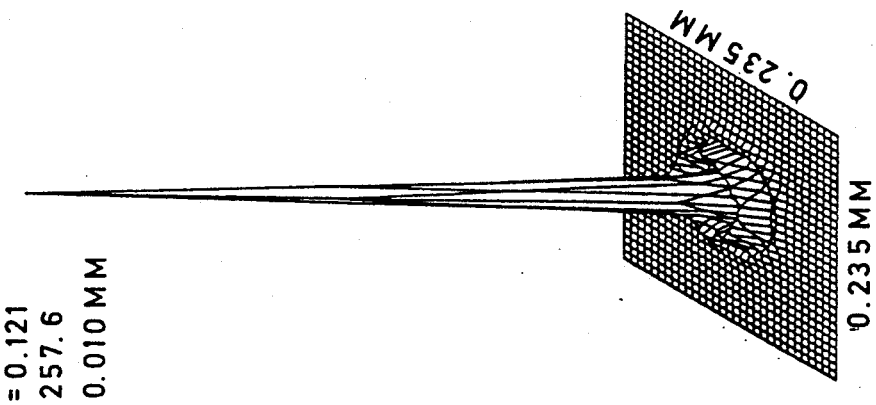
FIGS. 13a through 13f relate to FIG. 1 and show for various wavelengths, the intensity distribution of the Airy disk of the lens system with the air space d7 remaining fixed.
Figure 13B:
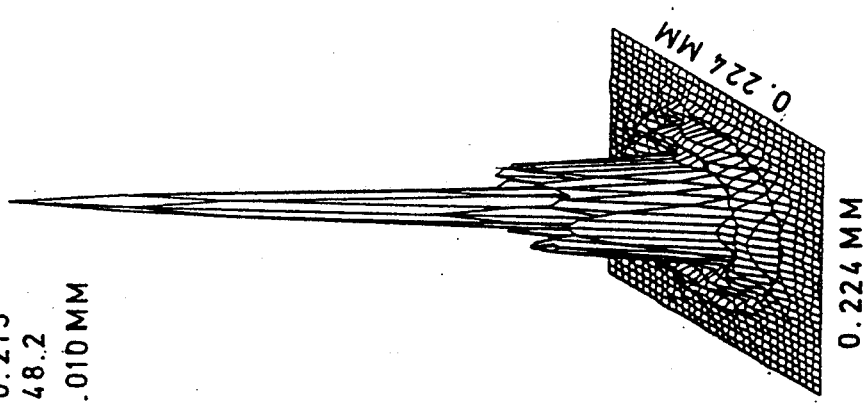
Figure 13A:
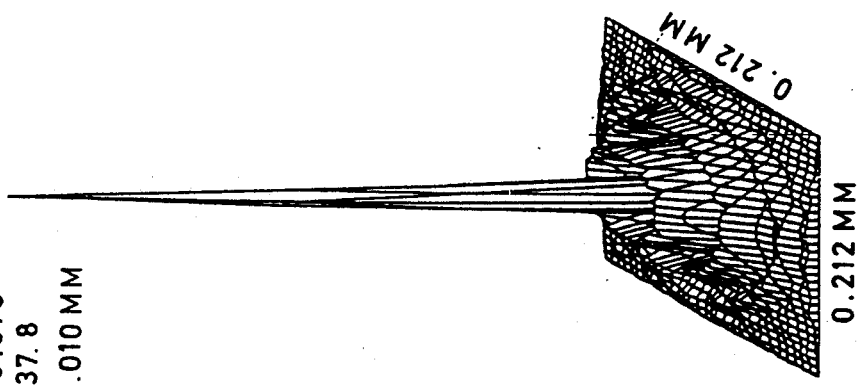
Figure 13F:
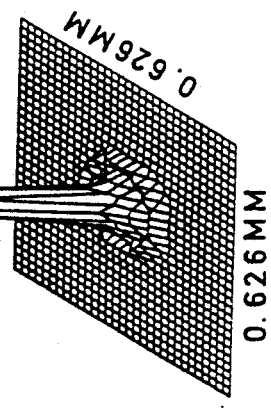
Figure 13E:
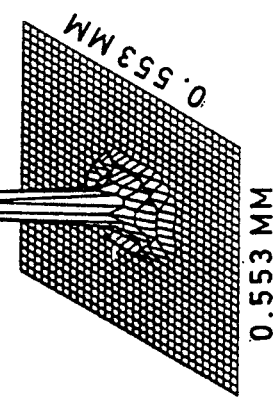
Figure 13D:
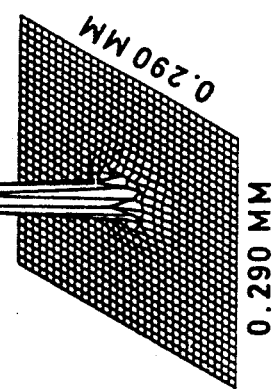
Figure 14C:
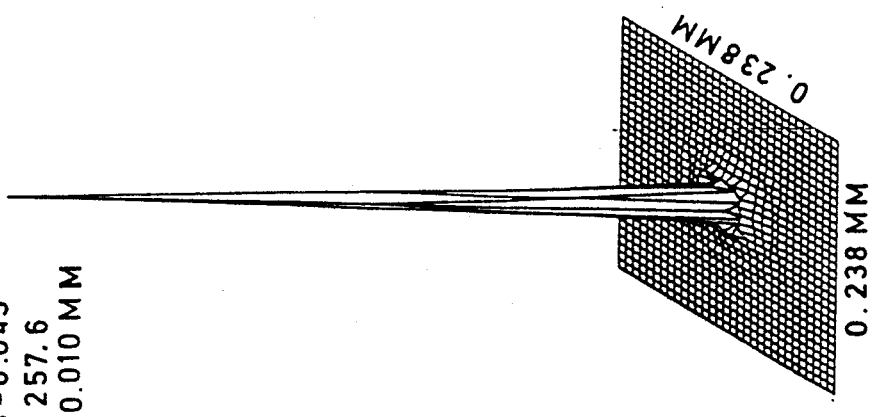
FIGS. 14a through 14f also relate to FIG. 1 and show the diameter of the Airy disk of the lens system for the same various wavelengths as in FIG. 13, but for each wavelength the air space d7 is adjusted to minimize aperture aberration.
Figure 14B:
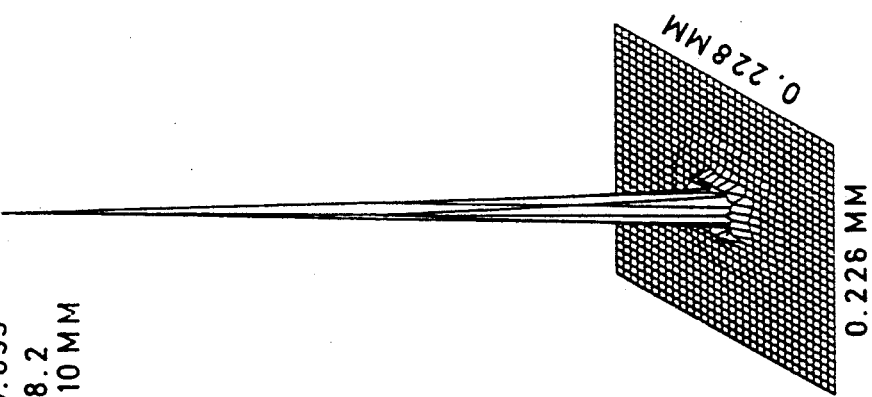
Figure 14A:
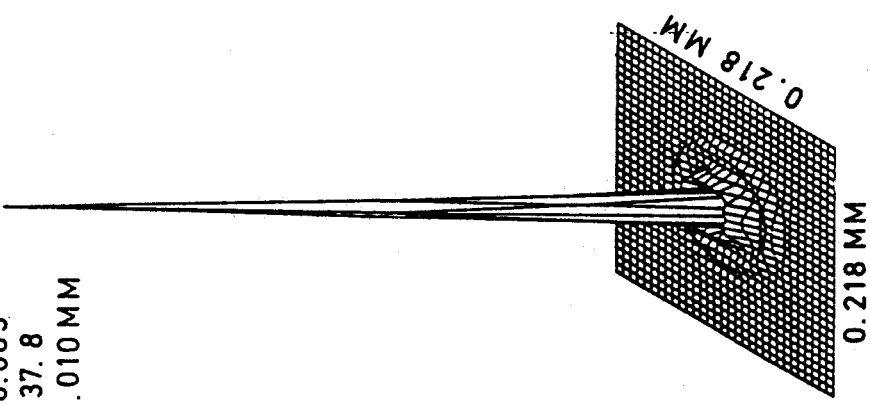
Figure 14D:
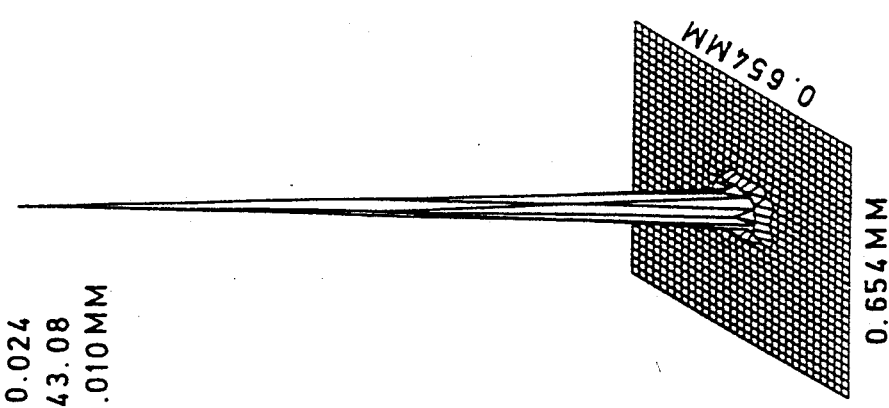
Figure 14E:
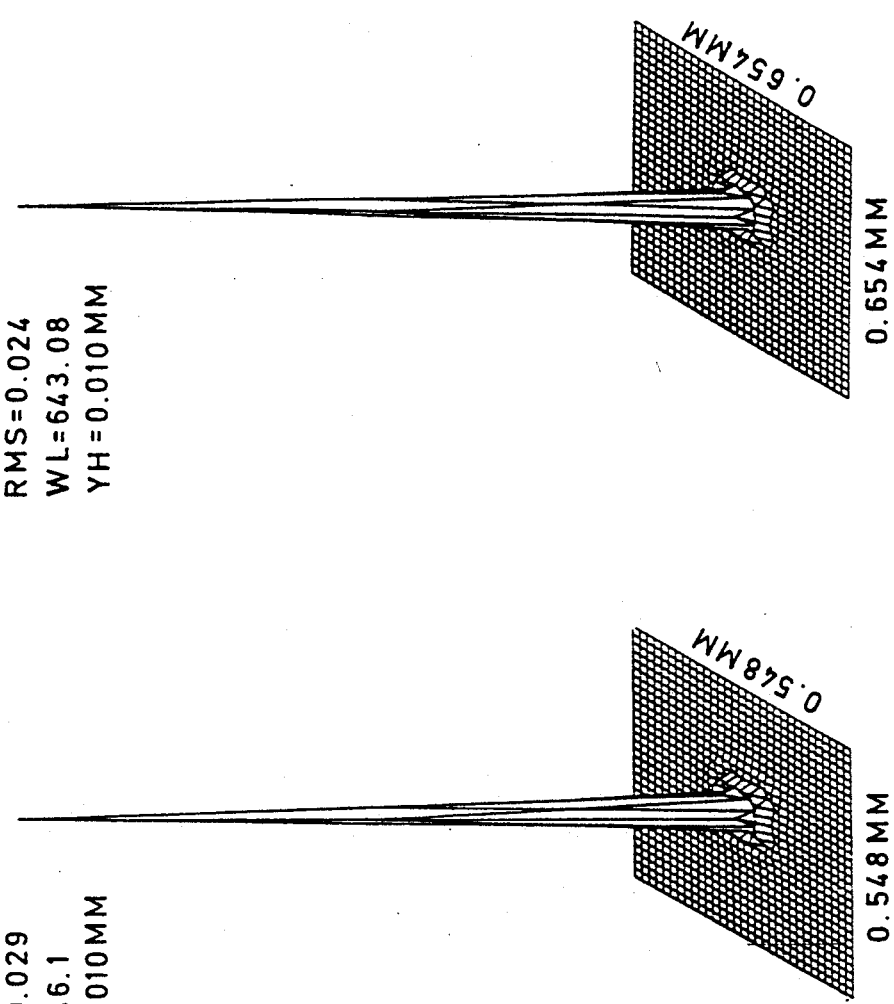
Figure 14F:
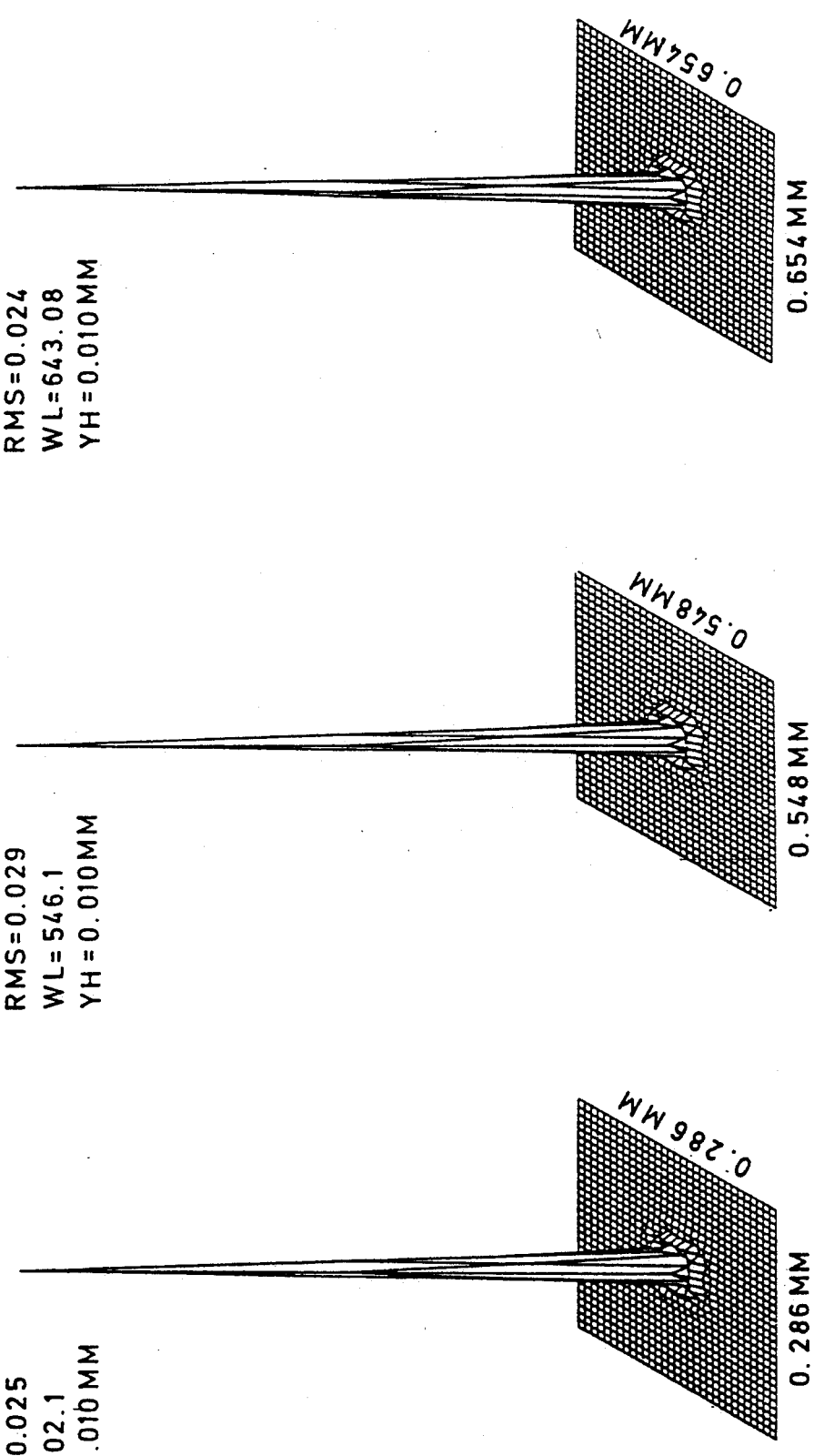

Working distance: do = 0.140 mm
Numeric aperture: NA = 0.80–0.87
Lateral amplification: $\beta = -100\times$
SPL = Suprasil
FL = Fluorite Referring now to the graph in FIG. 12 (which relates to the objective of FIG. 4), air spaces d2 and d4 are seen to be best suited for optimization of aperture aberration in the UV-range. Air spaces d7 and d9 are less well suited, because excessive adjustments are required for space d7 and because the adjustment of d9 necessary to minimize aberration for the UV-range goes in a different direction from the adjustement required for the visible spectral range.

The working distances for each of the objectives shown in FIGS. 1 through 4 are included with the other design parameters listed in their respective Tables I through IV. Also, the stated aperture ranges of 0.8 to 0.88 correspond to the large spectral range for which these objectives are corrected. In regard to these stated ranges, it should be understood that the aperture of 0.8 always applies to the visible spectral range, while the higher apertures between 0.86 and 0.88 apply to the UV-range. Incidentally, the two glass types used for these lenses are exclusively Suprasil and fluorite, which posses the following diffraction indices (nd) and dispersions ($\nu d$):

Suprasil: nd=1.4585; $\nu d$=67.3.
Fluorite: nd=1.4339; $\nu d$=95.2.

FIGS. 13a–f and 14a–f both illustrate the spatial intensity distribution of the Airy disk of the objective in the embodiment shown in FIG. 1. The mean diameter of the Airy disk is a good measure of how well a collimated light beam can be focused by the objective within the limits of diffraction, and a comparison of the Airy disk distributions in FIGS. 13 and 14 provides an insight into the advantages of the invention. Referring first FIGS. 13a–f, it can be seen that when air space d7 of the objective (FIG. 1) is kept constant at 0.18 mm, a sharp, diffractionally limited focus is obtained for the wavelength WL=302 nm. However, for the remaining wavelengths illustrated (and particularly for the UV-wavelengths WL=237.8 nm and WL=248.2 nm), the focal spot is greatly widened because the aperture aberration cannot be optimally corrected for these other wavelengths.

In contrast, the results illustrated in FIGS. 14a–f are based upon the adjustment of air space d7, for each of the respective indicated wavelengths, in accordance with distances plotted in FIG. 9. Special attention is called to the rather remarkable differences obtained at wavelengths 237.8 nm and 248.2 nm, the invention providing a diffractionally limited focus also for these wavelengths, thereby permitting high-resolution measurements, e.g., of wafer structures, at these wavelengths as well.

Therefore, each of the objectives of the invention includes a correction mount, which is calibrated in wavelength, for moving parts a and b of the objective relative to each other to alter the objective's respective selected air spaces (d7, d5, etc.) to optimize correction of aperture aberration.

It will be understood that the correction mount may also be coupled with a device for shifting the entire objective to compensate for any shift of the focal position due to the correction movement. The mechanical structure of such coupled correction mounts is well known and, therefore, is not shown or described in detail.

We claim:

1. A UV-capable dry objective for microscopes with an aperture greater than 0.7 and a lateral amplification of at least 60× which is corrected with regard to aperture aberration for the visible spectral range, said objective comprising:

at least a front lens group and a rear lens group separated by an air space and movable relative to each other to vary the size of said air space in accordance with a selected UV-wavelength, the size of said air space being adjusted to correct aperture aberration for said selected UV-wavelength.

2. The objective of claim 1 wherein each of said lens groups comprises a plurality of lens elements each separated from another by an air space, and wherein one of said air spaces is selected to separate said relatively movable lens groups.

3. The objective of claim 2 wherein said air space is selected so that any change in the size of said selected air space will simultaneously shift the wavelengths for which aperture aberration is optimally corrected in the UV-range and in the visible spectral range in opposite directions.

4. The objective of claim 3 wherein changes of aperture aberration contingent upon wavelength, as wavelength moves (i) toward the longer-wave visible spectral range and ii) toward the shorter-wave UV-range, will in both cases have the same mathematical sign.

5. The objective according to claim 1 wherein aperture aberration within the UV-range is corrected within diffraction limits up to a wavelength of 260 nm.

6. The objective according to claim 4, wherein the variable air space which separates the two lens groups is selected so that the changes in aperture aberration caused by (i) a shift in the size of said air space and (ii) alteration of the working distance of the objective due to sid shift, have the same mathematical sign.

7. The objective according to claim 1, wherein said objective comprises between eleven and thirteen lenses, with the lenses consisting of Suprasil and fluorite.

8. The objective according to claim 2, wherein said objective comprises between eleven and thirteen lenses, with the lenses consisting of Suprasil and fluorite.

9. The objective according to claim 3, wherein said objective comprises between eleven and thirteen lenses, with the lenses consisting of Suprasil and fluorite.

10. The objective according to claim 4, wherein said objective comprises between eleven and thirteen lenses, with the lenses consisting of Suprasil and fluorite.

11. The objective according to claim 5, wherein said objective comprises between eleven and thirteen lenses, with the lenses consisting of Suprasil and fluorite.

12. The objective according to claim 6, wherein said objective comprises between eleven and thirteen lenses, with the lenses consisting of Suprasil and fluorite.

13. A UV-capable dry objective for microscopes with an aperture greater than 0.7 and a lateral amplification of at least 60× which is corrected with regard to the aperture aberration for both the visible spectral range, and for a selected UV-wavelength, said objective having a front lens group and a rear lens group separated by an adjustable air space, and said lens groups comprising, when viewed in the direction of the light:

a concave-convex front lens component, a collecting lens group consisting of at least a concave-convex cemented component, a collecting individual lens, a first three-lens cemented component, a second three-lens cemented component, and a dispersing component separated from said second three-lens cemented component by an air space gretaer than the air spaces separating any of said other lenses and lens components.

14. The objective of claim 13 wherein said concave-convex front lens component is in the form of a cemented component.

15. The objective of claim 13 wherein said collecting lens group consists solelyd of a concave-convex cemented component.

16. The objective of claim 13 where said dispersing component consists of an individual lens element.

17. The objective of claim 13 wherein said concave-convex front lens component is in the form of an individual lens.

18. The objective of claim 13 wherein said collecting lens group further includes a concave-convex individual lens.

19. The objective of claim 13 wherein said dispersing component consists of a cemented component.

20. The objective of claim 13 wherein said lens groups are designed according to the following numerical data:

| r No. | Radius r/mm | Thickness/spacing d/mm | Glass |
|---|---|---|---|
| 0 |  | .249 |  |
| 1 | −.9716 | .740 | SPL |
| 2 | −.7608 | .100 | 1.0 |
| 3 | −3.4974 | .950 | FL |
| 4 | −1.6312 | .100 | 1.0 |
| 5 | −3.3497 | .600 | SPL |
| 6 | 4.2170 | 2.300 | FL |
| 7 | −3.2081 | .180 | 1.0 |
| 8 | −27.1880 | 1.300 | FL |
| 9 | −5.3088 | .100 | 1.0 |
| 10 | PLAN | 2.100 | FL |
| 11 | −3.3982 | .900 | SPL |
| 12 | 3.9242 | 2.300 | FL |
| 13 | −10.5930 | .100 | 1.0 |
| 14 | 12.3200 | 2.150 | FL |
| 15 | −4.0388 | .900 | SPL |
| 16 | 3.1623 | 2.000 | FL |
| 17 | PLAN | 7.840 | 1.0 |
| 18 | −4.8697 | 1.000 | FL |
| 19 | −25.3000 | 22.570 | 1.0 | wherein do (working distance)=0.249 mm; NA (numeric aperture)=0.80–0.87; β (lateral amplification)=−100×; and the reference symbols SPL and FL represent, respectively, Suprasil and Fluorite.

21. The objective of claim 13 wherein said lens groups are designed according to the following numerical data:

| r No. | Radius r/mm | Thickness/spacing d/mm | Glass |
|---|---|---|---|
| 0 |  | .137 | 1.0 |
| 1 | −1.0928 | .300 | SPL |
| 2 | 20.6762 | .790 | FL |
| 3 | −.8459 | .100 | 1.0 |
| 4 | −4.1330 | .800 | FL |
| 5 | −1.8234 | .100 | 1.0 |
| 6 | −4.6725 | .500 | SPL |
| 7 | 3.4961 | 1.900 | FL |
| 8 | −3.2424 | .100 | 1.0 |
| 9 | −134.2580 | 1.350 | FL |
| 10 | 5.2459 | .100 | 1.0 |
| 11 | 35.3889 | 2.803 | FL |
| 12 | −5.6431 | .900 | SPL |
| 13 | 2.9163 | 1.900 | FL |
| 14 | −11.6860 | .100 | 1.0 |
| 15 | 34.6749 | 1.800 | FL |
| 16 | −2.9203 | .900 | SPL |
| 17 | 2.6543 | 1.700 | FL |
| 18 | 81.5481 | 8.059 | 1.0 |
| 19 | −6.0541 | 1.000 | FL |

-continued

| r No. | Radius r/mm | Thickness/spacing d/mm | Glass |
|---|---|---|---|
| 20 | −13.3604 | 23.140 | 1.0 | wherein do (working distance)=0.137 mm; NA (numeric aperture)=0.80-0.88; β (lateral amplification)= −100×; and the reference symbols SPL and FL represent, respectively, Suprasil and Fluorite.

22. The objective of claim 13 wherein said lens groups are designed according to the following numerical data:

| r No. | Radius r/mm | Thickness/spacing d/mm | Glass |
|---|---|---|---|
| 0 |  | .147 | 1.0 |
| 1 | −1.53483 | 1.013 | SPL |
| 2 | −.82861 | .100 | 1.0 |
| 3 | −20.9844 | .500 | SPL |
| 4 | 2.42272 | 1.950 | FL |
| 5 | −2.44624 | .100 | 1.0 |
| 6 | −74.5372 | 1.350 | FL |
| 7 | −5.05030 | .100 | 1.0 |
| 8 | 19.7665 | 1.800 | FL |
| 9 | −3.33476 | .700 | SPL |
| 10 | 2.83726 | 1.800 | FL |
| 11 | −20.5046 | .100 | 1.0 |
| 12 | 93.7628 | .700 | SPL |
| 13 | 2.64222 | 2.600 | FL |
| 14 | −2.57330 | .700 | SPL |
| 15 | −11.9566 | 14.77 | 1.0 |
| 16 | −29.0833 | 1.000 | FL |
| 17 | 31.0171 | 19.05 | 1.0 | wherein do (working distance)=0.147 mm; NA (numeric aperture)=0.80-0.86; β (lateral amplification)= −100×; and the reference symbols SPL and FL represent, respectively, Suprasil and Fluorite.

23. The objective of claim 13 wherein said lens groups are designed according to the following numerical data:

| r No. | Radius r/mm | Thickness/spacing d/mm | Glass |
|---|---|---|---|
| 0 |  | .140 | 1.0 |
| 1 | −.8233 | .937 | SPL |
| 2 | −.7741 | .100 | 1.0 |
| 3 | −3.4588 | .850 | FL |
| 4 | −1.7700 | .100 | 1.0 |
| 5 | −3.4445 | .600 | SPL |
| 6 | 4.0231 | 2.050 | FL |
| 7 | −3.0358 | .100 | 1.0 |
| 8 | −49.0796 | 1.300 | FL |
| 9 | −5.1074 | .100 | 1.0 |
| 10 | 68.5668 | 1.900 | FL |
| 11 | −3.3799 | .900 | SPL |
| 12 | 4.1450 | 1.800 | FL |
| 13 | −12.9361 | 2.056 | 1.0 |
| 14 | 37.1443 | .900 | SPL |
| 15 | 2.7743 | 3.800 | FL |
| 16 | −2.9506 | 1.000 | SPL |
| 17 | PLAN | 19.820 | 1.0 |
| 18 | −9.2679 | .900 | FL |
| 19 | 13.8695 | 1.200 | SPL |
| 20 | −22.4723 | 7.926 | 1.0 | wherein do (working distance)=0.140 mm; NA (numeric aperture)=0.80-0.87; β (lateral amplification)= −100×; and the reference symbols SPL and FL represent, respectively, Suprasil and Fluorite.

* * * * *